United States Patent [19]

Yoshiura et al.

[11] Patent Number: 5,319,739
[45] Date of Patent: Jun. 7, 1994

[54] METHOD FOR RETRIEVING CASE FOR PROBLEM AND INFERRING SOLUTION OF THE PROBLEM AND SYSTEM THEREOF

[75] Inventors: Hiroshi Yoshiura, Yokohama; Tadashi Hirose, Komae, both of Japan

[73] Assignee: Hitachi, Ltd., Tokyo, Japan

[21] Appl. No.: 791,479

[22] Filed: Nov. 12, 1991

[30] Foreign Application Priority Data

Nov. 22, 1990 [JP] Japan .................................. 2-316127

[51] Int. Cl.⁵ ............................................ G06F 15/18
[52] U.S. Cl. ......................................... 395/51; 395/77
[58] Field of Search .............................. 395/50, 51, 77

[56] References Cited

U.S. PATENT DOCUMENTS 5,224,206 6/1993 Simoudis .............................. 395/77

OTHER PUBLICATIONS

Koton, P. A., Using Experience in Learning and Problem Solving, Massachusetts Institute of Technology, 1988.
Hinkle, D., "Clavier: A Case Based Autoclave Loading Advisor," Lockheed Artificial Intelligence Center, AIC-90-107, Mar. 1990.
Navinchandra et al., "Behavioral Synthesis in CADET, a Case-Based Design Tool," Proc. 7th IEEE Conf. on Artificial Intelligence Applications, Feb. 24-28, 1991, 217-221.
Kolodner et al., "The MEDIATOR: Analysis of an Early Case-Based Problem Solver," Cognitive Science, 1989, 507-549.
"Proceedings Case-Based Reasoning Workshop", Sponsored by Defense Advanced Research Projects Agency Information Science and Technology Office, May 1988, pp. 21-30. (Provided in English).
"Design and Analysis I of Algorithm", Science Corp., 1977, pp. 180-182. (Provided in Japanese).
"An Approach to Knowledge Acquisition Bottleneck Using Case-Based Reasoning", (1-Case Utilization Method), Information Processing Society of Japan, The National Convention Collection of Papers, 4D-7, Mar. 1990, pp. 274-275. (Provided in Japanese).
"An Approach to Knowledge Acquisition Bottleneck Using Case-Based Reasoning", (2-Application to Computer Room Layout Problem), Information Processing Society of Japan, The National Convention Collection of Papers, 4D-8, Mar. 1990, pp. 276-277. (Provided in Japanese).

Primary Examiner—Michael R. Fleming
Assistant Examiner—Robert W. Downs
Attorney, Agent, or Firm—Fay, Sharpe, Beall, Fagan, Minnich & McKee

[57] ABSTRACT

In a method of retrieving optimum case information for a current problem, case candidates having features of the current problem and common features are retrieved from information representing a plurality of cases stored in a case base in response to presentation of the current problem. A storing unit stores the case base, and respective cases include case problems and solutions or solving methods for the case problems. An optimum case candidate among case candidates is determined from a group of features of the current problem, a group of common features and a group of features of problems of respective case candidates in accordance with influence relation information indicating a feature group influenced by other feature groups. Case information corresponding to the optimum case candidate is retrieved from information representing a plurality of cases.

19 Claims, 15 Drawing Sheets

FIG. 3

| ⟨FEATURE₁₁⟩ | ⟨FEATURE₁₂⟩ | ... | ⟨FEATURE₁ₖ₁⟩ | ⟨FEATURE'₁₁⟩ | ⟨FEATURE'₁₂⟩ | ... | ⟨FEATURE'₁ₘ₁⟩ |
|---|---|---|---|---|---|---|---|
| ⟨FEATURE₂₁⟩ | ⟨FEATURE₂₂⟩ | ... | ⟨FEATURE₂ₖ₂⟩ | ⟨FEATURE'₂₁⟩ | ⟨FEATURE'₂₂⟩ | ... | ⟨FEATURE'₂ₘ₂⟩ |
| ⋮ | ⋮ | | ⋮ | ⋮ | ⋮ | | ⋮ |
| ⟨FEATUREₙ₁⟩ | ⟨FEATUREₙ₂⟩ | ... | ⟨FEATUREₙₖₙ⟩ | ⟨FEATURE'ₙ₁⟩ | ⟨FEATURE'ₙ₂⟩ | ... | ⟨FEATURE'ₙₘₙ⟩ |

| ⟨FEATURE″₁₁⟩ | ⟨FEATURE″₁₂⟩ | ... | ⟨FEATURE″₁ₚ₁⟩ | ⟨SOLUTION₁⟩ |
|---|---|---|---|---|
| ⟨FEATURE″₂₁⟩ | ⟨FEATURE″₂₂⟩ | ... | ⟨FEATURE″₂ₚ₁⟩ | ⟨SOLUTION₂⟩ |
| ⋮ | ⋮ | | ⋮ | ⋮ |
| ⟨FEATURE″g₁⟩ | ⟨FEATURE″g₂⟩ | ... | ⟨FEATURE″gₚg⟩ | ⟨SOLUTIONg⟩ |

| | | 601 |
|---|---|---|
| IF $\langle FEATURE_{11}'''\rangle$ $\langle FEATURE_{12}'''\rangle$ .... $\langle FEATURE_{1r_1}'''\rangle$ | THEN $\langle PROCESSING\ 1\rangle$ | |
| IF $\langle FEATURE_{21}'''\rangle$ $\langle FEATURE_{22}'''\rangle$ .... $\langle FEATURE_{2r_2}'''\rangle$ | THEN $\langle PROCESSING\ 2\rangle$ | |
| ... | ... | |
| IF $\langle FEATURE_{S1}'''\rangle$ $\langle FEATURE_{S2}'''\rangle$ .... $\langle FEATURE_{Sr_S}'''\rangle$ | THEN $\langle PROCESSING\ S\rangle$ | |

FIG. 8

| | |
|---|---|
| CONSOLE DISPLAY, | CARD READER | } 801
| CONSOLE DISPLAY, CARD READER | CARD PUNCHER |
| CONSOLE DISPLAY | CARD PUNCHER |
| CARD PUNCHER | TAPE READER |
| CONSOLE DISPLAY, CARD READER | FLOPPY DISK DRIVE |
| CONSOLE DISPLAY | FLOPPY DISK DRIVE |
| LINE PRINTER | CARD PUNCHER |

FIG. 9

| | |
|---|---|
| CONSOLE DISPLAY, CARD READER, FLOPPY DISK DRIVE | <LAYOUT 1> } 901 |
| CONSOLE DISPLAY, CARD PUNCHER, TAPE READER | <LAYOUT 2> } 902 |
| CONSOLE DISPLAY, CARD READER, CARD PUNCHER, FLOPPY DISK DRIVE, | <LAYOUT 3> } 903 |
| CONSOLE DISPLAY, CARD READER, CARD PUNCHER, LINE PRINTER, TAPE READER | <LAYOUT 4> } 904 |

FIG. 10

| | | |
|---|---|---|
| IF CONSOLE DISPLAY | THEN ⟨PROCESSING 1'⟩ | 1001 |
| IF LINE PRINTER | THEN ⟨PROCESSING 2'⟩ | 1002 |
| IF CARD READER | THEN ⟨PROCESSING 3'⟩ | 1003 |
| IF CARD PUNCHER | THEN ⟨PROCESSING 4'⟩ | 1004 |
| IF TAPE READER | THEN ⟨PROCESSING 5'⟩ | 1005 |
| IF FLOPPY DISK DRIVE | THEN ⟨PROCESSING 6'⟩ | 1006 |

METHOD FOR RETRIEVING CASE FOR PROBLEM AND INFERRING SOLUTION OF THE PROBLEM AND SYSTEM THEREOF

BACKGROUND OF THE INVENTION

1. Field of the Invention

The present invention relates to a method of retrieving an optimum case for a given problem from a case data base and inferring a solution of the problem by using the retrieved case, and a system therefor.

2. Description of Related Art

Case information means data composed of data representing a problem and data representing a solution of the problem or a way to solve the problem, i.e., a solving method. One of the objects of using case information is such that a system retrieves a solved case of a problem similar to a problem to be currently solved (an analogous case) and a user refers to the solution or the solving method in that case. Another object of using case information is such that the system retrieves the analogous case and further performs an inference by using the analogous case, thereby to obtain a solution of a current problem. Thus, a technical subject for using case information is to develop a method of retrieving an analogous case which furnishes with much information for the current problem out of a plurality of accumulated cases and a method of solving the problem by using the analogous case.

A conventional method of retrieving and using an analogous case is discussed in "Case-Based Reasoning Workshop", (1988) pp. 21-30, for instance. A problem is represented therein by using goals which are desired to achieve in the problem and constraints which are to be satisfied in solving the problem. First, the following processing method has been proposed for analogous case retrieval.

(1) Goals of the current problem and goals of the problem in a case are compared with each other, so as to select cases including plenty of common goals.

(2) When a plurality of cases are obtained in the processing (1), the constraints of the current problem and the constraints of the problem in the case, i.e., the case problem are compared with one another so as to select cases which hold one or more important constraints in common. (However, information relating to significance of constraints is given to the system in advance.)

This system is based on the following thoughts in substance.

(1) The more features the current problem and the case problem includes in common, the more similar those cases are.

(2) In order to reflect not only the number of features held in common but also the significance thereof in processing, weighting of features is applied.

Further, the following processing method has been proposed for the use of the analogous case.

(1) Regarding a partial problem represented by a feature group which is shared by the current problem and the case problem as a partial problem common to the current problem and the case problem, a portion corresponding to the partial problem is taken out of the solution of the case.

(2) The taken out partial solution is modified so as to be adapted to the current problem and is used as a part of the solution of the current problem.

A plurality of partial problems involved in one problem are not independent of one another in various fields. Namely, a plurality of features representing the problem are not independent of one another. Since an influence relation, an interference relation or a dependency relation among these features has not been considered in the conventional system, it has happened sometimes that a case having less utility for solving the current problem is retrieved.

For example, positioning of individual equipment may be considered as a partial problem in a layout problem in a computer room. Here, the positioning of a card reader and a card puncher for katakana characters (hereinafter referred simply as a card puncher) depends on the positioning of a console display. That is, an influence relation exists among these partial problems.

Now, when a set of equipment names to be arranged are used as a feature group representing the problem, it is assumed that the current problem is the positioning problem represented by {card reader, card puncher, console display}, viz., the layout problem of a card reader, a card puncher and a console display. Further, it is assumed that the case includes a card reader, and a card puncher, but does not include a console display (for example, it is arranged in another room sometimes). In this case, the current problem and the case problem include a card reader and a card puncher in common, but the positioning of these units in the case is not applicable in the current problem. Because, the layout of the card reader and the card puncher varies depending on existence of the console display.

On the other hand, it is assumed that the current problem includes a card reader and a card puncher and does not include a console display. Further, it is assumed that the case problem includes a card reader, a card puncher and a console display. On this occasion, a case can neither be used for the positioning of the card reader and the card puncher because of the same reason as described previously. In this manner, the solution of the case cannot necessarily be used on common features. Therefore, the case including much common features is not necessarily a useful case.

Further, the existence of the console display determines usefulness of a case in the above-described example. However, the console display is not important sometimes depending on the problem. For example, the positioning of a communication control processor and a power supply unit does not depend on the positioning of the console display. Accordingly, it is not important whether the case includes a console display or not when a case is retrieved in the layout thereof. In this manner, the significance of the features depends on the combination of a problem and a case, and is not fixed. Thus, a useful case cannot necessarily be retrieved even when weighting of features is used.

According to a conventional method of retrieving a case, a case of little usefulness is retrieved sometimes as described above. Thus, there have been such problems as waste of time due to repetition of retrieval and mistakes in determination based on an inappropriate case.

Further, in a conventional method of using a case, all partial solutions of cases corresponding to common features in a current problem and a case problem have been used as the partial solution of the current problem. Thus, it has been required to correct the effect of influence among features. For example, since the layout in a case of a card reader and a card puncher cannot be used as it is under the influence of a console display, the layout thereof has been required to be corrected in above-described example. Thus, in a conventional method of using a case, there have been such problems as complicated processing is required for correcting influence among features, the development period and the development cost for an inference system gets longer and higher, and performance and reliability are lowered.

One of the techniques for solving the above-described problems has been proposed by YOSHIURA et al., YOSHIURA being an inventor of the present application, at the national convention of Information Processing Society of Japan. The proposal has been made in "An Approach to Knowledge Acquisition Bottleneck using Case-Based Reasoning (1),—Case Utilization Method—", Information Processing Society of Japan, the national convention collection of papers, 4D-7, pp. 274-275, March (1990) and "An approach to knowledge Acquisition Bottleneck using Case-Based Reasoning (2),—Application to Computer Room Layout Problem—", Information processing Society of Japan, the national convention collection of papers, 4D-8, pp. 276-277, March (1990).

The technique proposed by YOSHIURA et al. will be explained hereinafter. In this technique, dependency relation information is referred to, features that are to be included in a case to be retrieved and features that should not be included therein are obtained and cases are retrieved from a case base using these features.

In accordance with a case and features to be included in a case to be retrieved, a solution of a current problem is obtained the cases by using a portion, of a solution in the case, corresponding to a partial problem represented by these features.

With reference to FIG. 14, a variable T substituted for dependency relation information between features and a variable FI substituted for a feature set which should be included in an analogous case are adopted as input arguments. A portion related to the inputted current problem among dependency relation information is substituted for the variable T as an initial value. Further, the whole feature set of the current problem is substituted for the variable FI.

The contents of processing will be described hereinafter. In a step 1301, a feature set which should not be included in an analogous case is obtained and substituted for a variable FE. Here, a procedure $P_{roc}$ is a procedure for obtaining a feature set which should not be included in an analogous case with the feature set FI to be included in an analogous case as an argument. The contents of processing in the procedure $P_{roc}$ will be described in detail later with reference to FIG. 15.

In a step 1302, a case including all features in the variable FI and no feature in the variable FE is retrieved from a case base. An appropriate case can be retrieved by using variables FI and FE. In a step 1303, the existence of a pertinent case is determined. When a case exists, the case is delivered to a controller in a step 1304 and processing is stopped thereafter. When a case does not exist, the processing proceeds to a step 1305.

In a step 1305, a list of features which do not appear in the variable T among features of a problem is formed, which is substituted for a variable L. The variable L is a list of features to be removed from the variable FI.

In a step 1306, it is determined whether the variable L is empty or not. If the variable L is empty, there is no feature to be removed from the variable FI, that is, a new variable FI cannot be obtained. Therefore, the processing is brought to a standstill and returned. If the variable L is not empty, the processing proceeds to a step 1307.

In the step 1307, one of the features is taken out of the variable L and substituted for a variable F. In a step 1308, the taken out feature is removed from the variable L. In a step 1309, the result obtained by removing the variable F from the variable FI is substituted for a variable FI'. The variable FI' is a new candidate of a feature set to be included in an analogous case. When an analogous case is retrieved using the variable FI', the feature set held in common by the problem and the analogous case is the variable FI'. Here, the feature of the variable F removed from the variable FI does not appear in the dependency relation information T. Therefore, the variable F is not the feature exerting an influence upon the partial problem corresponding to the variable FI'. Thus, features which exert an influence upon the partial problem corresponding to the variable FI' and are included in the feature set of the inputted problem are all included in the variable FI', viz., the feature set of the retrieved analogous case.

In a step 1310, a table showing the result obtained by removing the variable F from the variable T is substituted for a variable T'. In a step 1311, the present processing is executed recursively with the sets FI' and T' as arguments in place of the sets FI and T. When an analogous case is found in the process of this recursive execution, the analogous case is outputted in the step 1304, and the operation is stopped. When an analogous case is not found, the processing returns to the step 1311 through the step 1306. As a result, the processing proceeds to the step 1306. At this time, in the steps 1306 to 1310, the features that are different from the last occasion are removed from the set FI, and a case is retrieved again in the step 1311. When every possibility becomes exhausted, Yes is determined in the step 1306 in the processing at the top level, and the whole processing returns to the controller.

FIG. 15 shows the operation of the procedure $P_{roc}$ of the step 1301 shown in FIG. 14. The procedure $P_{roc}$ is for obtaining a feature set which should not be included in an analogous case with the feature set FI which should be included in an analogous case as an argument. In a step 1401, the set FI is substituted for a set S.

In a step 1402, dependency feature information having no relation with the current problem is obtained from a group of dependency feature information. To be concrete, dependency feature information including what is not the feature of the current problem is found, and a table composed of the information is formed and substituted for the variable T1.

In a step 1403, dependency feature information with the right member of which is included in the variable S among the variable T1 is taken out, and a table consisting of such information is generated and substituted for the variable T1'. In a step 1404, a set of features included in the variable T1' is obtained and substituted for the variable S'. A feature set exerting an influence directly upon a partial problem corresponding to the variable FI is substituted for the variable S'.

What is to be noted here is that there is the possibility that features exert an influence indirectly upon the solution of the problem even if there were no dependency feature information including features and problems. For example, when A exerts an influence upon B and B exerts an influence upon C, a dependency relation that A exerts an influence upon C exists.

Thus, it is needed to obtain a feature set which exerts an influence upon a partial problem corresponding to the variable FI including such an indirect influence. For that purpose, it is only required to repeat processings in the steps 1403 and 1404 until the variable S converges.

In a step 1405, convergence is determined. In the case of convergence, that is, when features which are not included in the variable S do not exist in the variable S', the set in which features in the variable FI have been removed from the variable S is returned to the main routine shown in FIG. 14 as a feature set which should not be included in an analogous case. In the case of no convergence, that is, when features which are not included in the variable S exist in the variable S', a union of the sets S and S' is obtained a new as a set S in a step 1407 and the processing is returned to the step 1403.

As described above, according to this technique, the set FI is initialized to the whole feature set of the current problem. The case corresponding to at least a part of the feature set common to the case problem and the current problem can be used for solving the current problem. Hence, the initial value of the set FI is the largest possible set as the use portion. The set substituted for the set FI is reduced one element at a time, and retrieval of the case is applied on all such occasions in the step 1309. As a result, a case in which the use portion reaches the maximum is retrieved. A part corresponding to a partial problem represented by the set FI among the solutions of the case is the part that can be used without compensation for the influence.

In the next place, another case retrieval processing which has been proposed at the same time will be explained. In the case retrieval processing, a part which is related to the current problem is picked out of the dependency relation information table first and is substituted for the variable T. Further, the total number of the features of the problem is substituted for a variable N.

With reference to FIG. 16, a variable I is initialized in a step 1501. This variable I is a counter for selecting one feature from a feature set of a problem. In a step 1502, it is determined whether all the featues have been selected completely or not. In the case of Yes in the step 1502, the processing is returned assuming that there was no analogous case. In the case of No, the processing proceeds to a step 1503.

In the step 1503, the variable I is increased by "1" only. In a step 1504, the Ith feature in the feature set of the problem is selected, and a set having the Ith feature as an element is set in the set S1. In a step 1505, a table in which dependency feature information with a part of the variable set T included in the set S1 is collected is set as a set T2. In a step 1506, a set composed of features included in the set T2 is set as a variable set S2. With above-described processing, a feature set which exerts an influence directly upon a partial problem corresponding to the set S1 is substituted for the set S2.

In a step 1507, a union of the sets S1 and S2 is set as a set S1'. Here, in order to obtain a feature set which exerts an influence indirectly upon the set S1, the steps 1505 to 1507 are repeated until the sets S1 and S1' converge. In a step 1508, convergence is determined. In the case of convergence, that is, when S1=S1', the processing proceeds to a step 1510. In the case of no convergence, the set S1 is replaced with the set S1' in a step 1509, and the processing is returned to the step 1505.

As described, all the features included in the current problem among those features that exert an influence upon a partial problem corresponding to the set S1 are included in the set S1. This set S1 becomes a feature set to be included in an analogous case. When the analogous case is retrieved using the set S1, the feature set included in common in the analogous case and the problem is the set S1. Accordingly, those features that exert an influence upon a partial problem corresponding to the feature set included in common in the analogous case and the problem and are included in the problem are all included in the analogous case, too.

In a step 1510, the procedure $P_{roc}$ shown in FIG. 15 is invoked with the set S1 as an argument, and the feature set which should not be included in the analogous case is obtained and set as the variable set FE.

In a step 1511, cases including the set S1 and including no set FE are retrieved from the case base. In a step 1512, it is determined whether an analogous case has been found or not. When it is found, the analogous case is delivered to the controller in a step 1513, thus completing retrieval processing. When it is not found, the processing is returned to the step 1502, and above-described processing is repeated using other partial problems.

(a) An Approach to Knowledge Acquisition Bottleneck using Case-Based Reasoning (1),—Case Utilization System—:

a new system of case-based inference for solving a problem based on past cases. In general, case-based inference consists of processes for retrieving the most effective case for solving a current problem among a plurality of cases (case retrieval processing) and processes for solving the problem based on the retrieved cases (case using processing). In the case using processing of the proposed system, a portion which is applicable as it is to the current problem is brought down, and that portion is used. In the case retrieval processing, a case in which a solvable portion on the current problem reaches the maximum is retrieved. As to the means of realization, the knowledge related to the problem and the relation among elements of the cases is used, the problem and the cases are divided into parts, respectively, and the influence relation among the parts is analyzed, thereby to retrieve an objective case and further determine the usable parts therein.

(b) An Approach to Knowledge Acquisition Bottleneck using Case-Based Reasoning (2),—Application to Computer Room Layout Problem—:

a computer room layout system using above-described system (a system of arranging various equipments in a computer room) is described.

As described above, according to above-described two proposed techniques, the cases usable without compensation for the influence can be retrieved. As it is apparent from FIGS. 14 to 16, however, processings are determined consecutively on respective features and unnecessary elements are reduced one by one. Thus, there has been a problem that processing for retrieving usable cases is complicated and takes a long period of time.

Furthermore, in a conventional method of retrieving and using a case, it has been assumed that all the solutions of a current problem are obtained from a case. Actually, however, a user desires sometimes to designate a part of the solution of the current problem or to obtain a part of the solution by means of another inference system using no cases. Such requirements could not be met with a conventional system of retrieving and using a case.

SUMMARY OF THE INVENTION

It is an object of the present invention to provide a case retrieval method for retrieving cases having large utility for solving a current problem with priority and a system therefor.

It is another object of the present invention to provide a case using method which does not require influence compensation among features against a solution of a case and a system therefor.

It is still another object of the present invention to provide a case retrieval method when a part of a solution of a current problem has been predetermined and a remaining partial solution is obtained and a system therefor.

Furthermore, it is another object of the present invention to provide a case using method which does not require influence compensation among features for a solution of a case when a part of a solution of a current problem has been predetermined and a remaining partial solution is obtained and a system therefor.

In order to achieve the above-described objects, a method for retrieving optimum case information for a current problem, includes the steps of:

retrieving candidates of cases having features common to the features of the current problem from information representing a plurality of cases stored in a case base in response to an offer of a current problem, wherein a storage unit storing a case base and respective cases including the problem of cases and a solution or a solving method for the problem of the cases;

determining an optimum case candidate out of case candidates based on a group of features of a current problem, a group of common features and a group of features of problems of respective case candidates in accordance with influence relation information representing feature groups that are influenced by feature groups; and retrieving case information corresponding to the optimum case candidate from information representing a plurality of cases.

According to the present invention, it is possible to retrieve cases including much information applicable as it is to a current problem. Therefore, it is possible to prevent waste of time due to resumption of retrieval and mistakes in determination based on an inappropriate case.

Further, it is possible to select and use information applicable as it is to a current problem among information included in a case. Therefore, it becomes possible to simplify processing for applying case information to a current problem, and it is also possible to reduce the cost and the period of system development and to improve performance and reliability of the system.

BRIEF DESCRIPTION OF THE DRAWINGS

FIG. 3 is a block diagram of an influence relation information table used in the present invention;

FIG. 4 is a block diagram of a case information table used in the present invention;

FIG. 5 is a block diagram of case use rules used in the present invention;

FIG. 8 shows an example of a dependency relation information table;

FIG. 9 shows an example of a case information table;

FIG. 10 shows an example of a case use rule group;

DESCRIPTION OF THE PREFERRED EMBODIMENTS

A case retrieving/inferring system of the present invention will be explained hereinafter with reference to the accompanying drawings.

According to the present invention, an analogous case optimum to a problem is retrieved among a plurality of cases, and a solution of the problem is inferred using the retrieved case. In the process of retrieving the optimum case, an influence relation among features of the problem is important. Therefore, it will be clarified first how the influence relation among the features of the problem exerts influence upon usefulness of the retrieved case. Following properties are effected relating to the usefulness of the retrieved.

Theorem 1

When a partial problem P of a problem of a case meets the following conditions, a solution or a way S to solve the problem, i.e., a solving method of a case corresponding to the partial problem may be used as a part of a solution or a solving method of a current problem without compensation for the influence.

(1) A partial problem P corresponds to a set A of features which is common to the current problem and a problem of a case, i.e., a case problem.

(2) The feature set A is not influenced by features included in only one of the current problem and the case problem.

This theorem will be proved briefly.

Proof

When it is assumed that the partial problem of the current problem corresponding to the feature set A is P', the partial problems P and P' are equal to each other from the condition (1). From the condition (2), the partial problems P and P' are independent of other portions of the case problem and the current problem. Thus, the solution or the solving method S of the partial problem P in the case is also the solution or the solving method of the partial problem P' in the solution of the current problem. Accordingly, the solving method S may be used as a partial solution or a partial solving method of the current problem without compensation for the influence.

Figure 13:
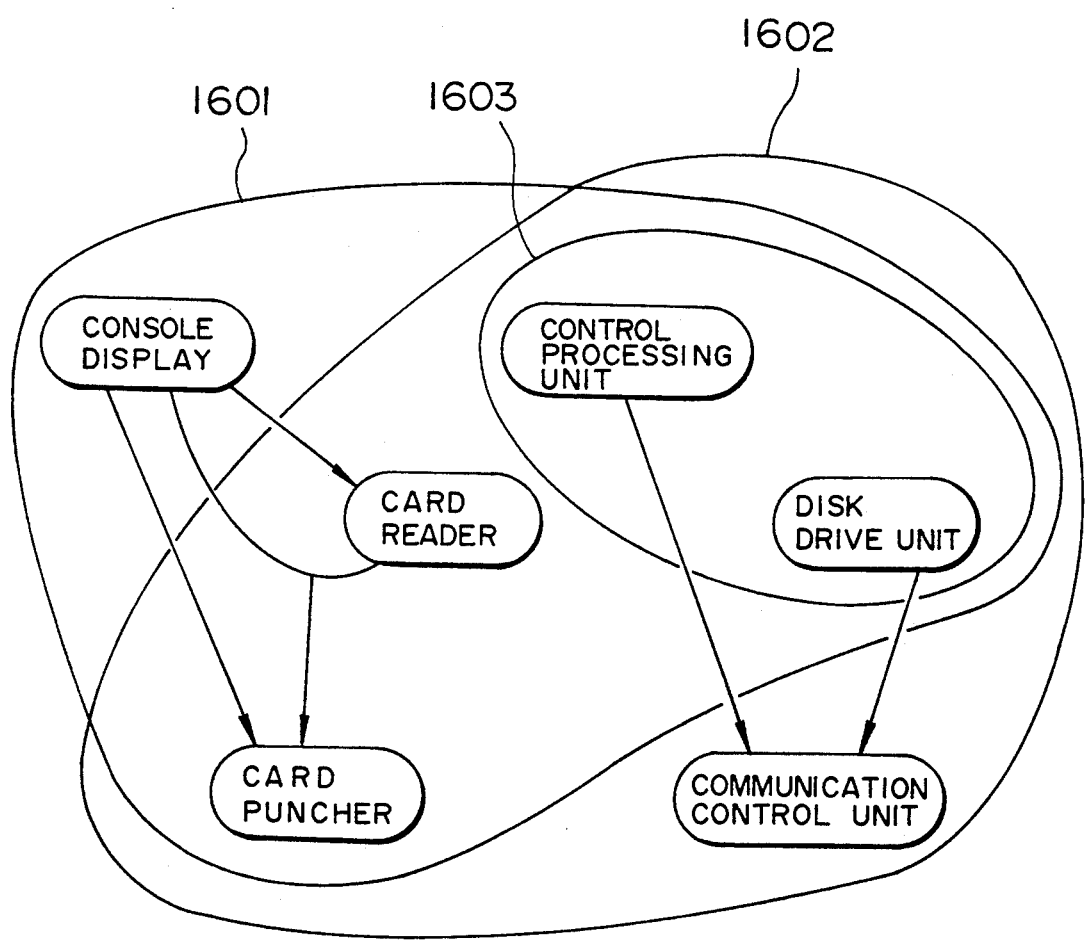
FIG. 13 is an explanatory diagram for explaining the theorem 1 used in a method of the present invention.
Figure 14:
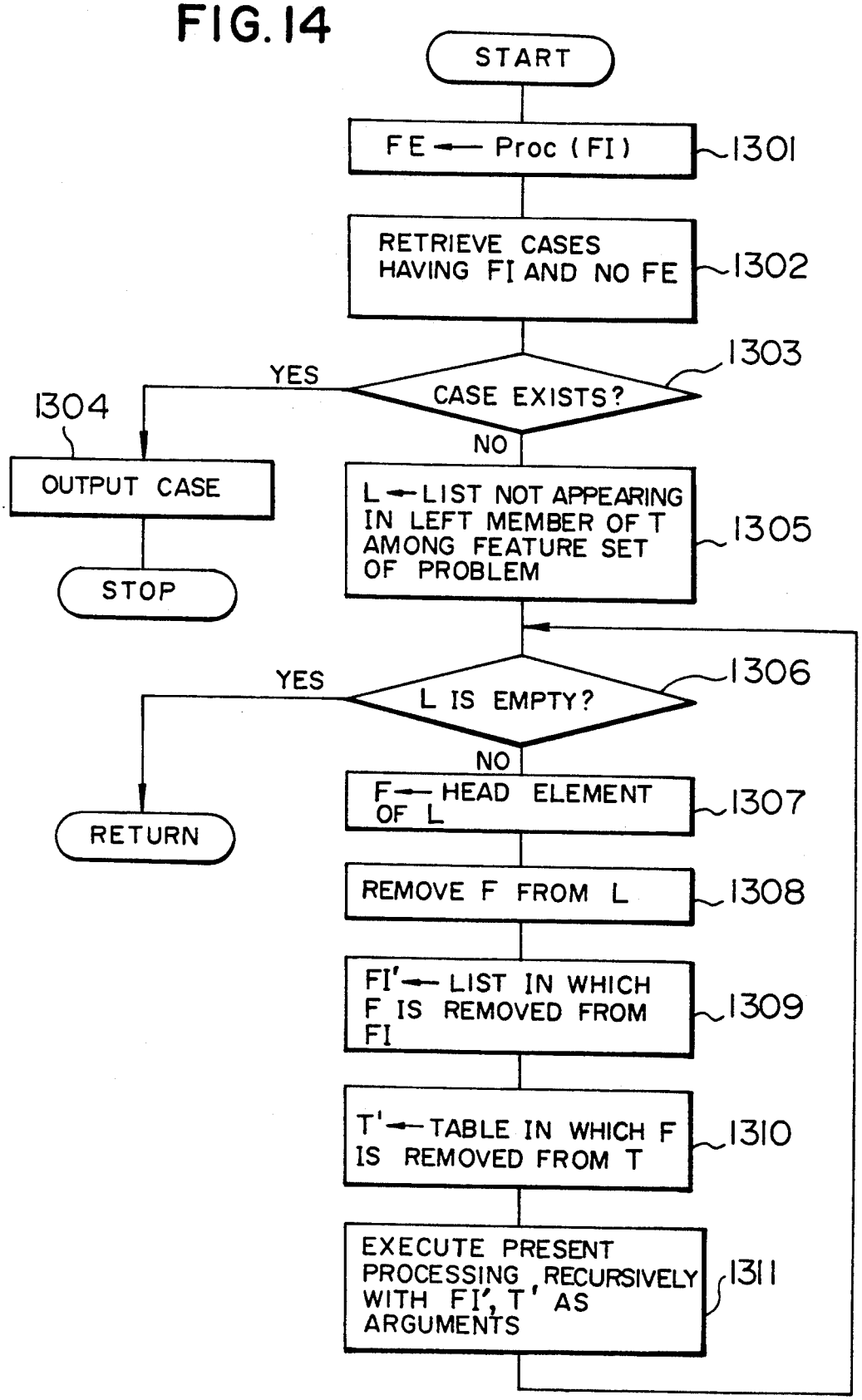
FIG. 14 is a flow chart showing an outline of an operation of a case retrieval processing.
Figure 15:
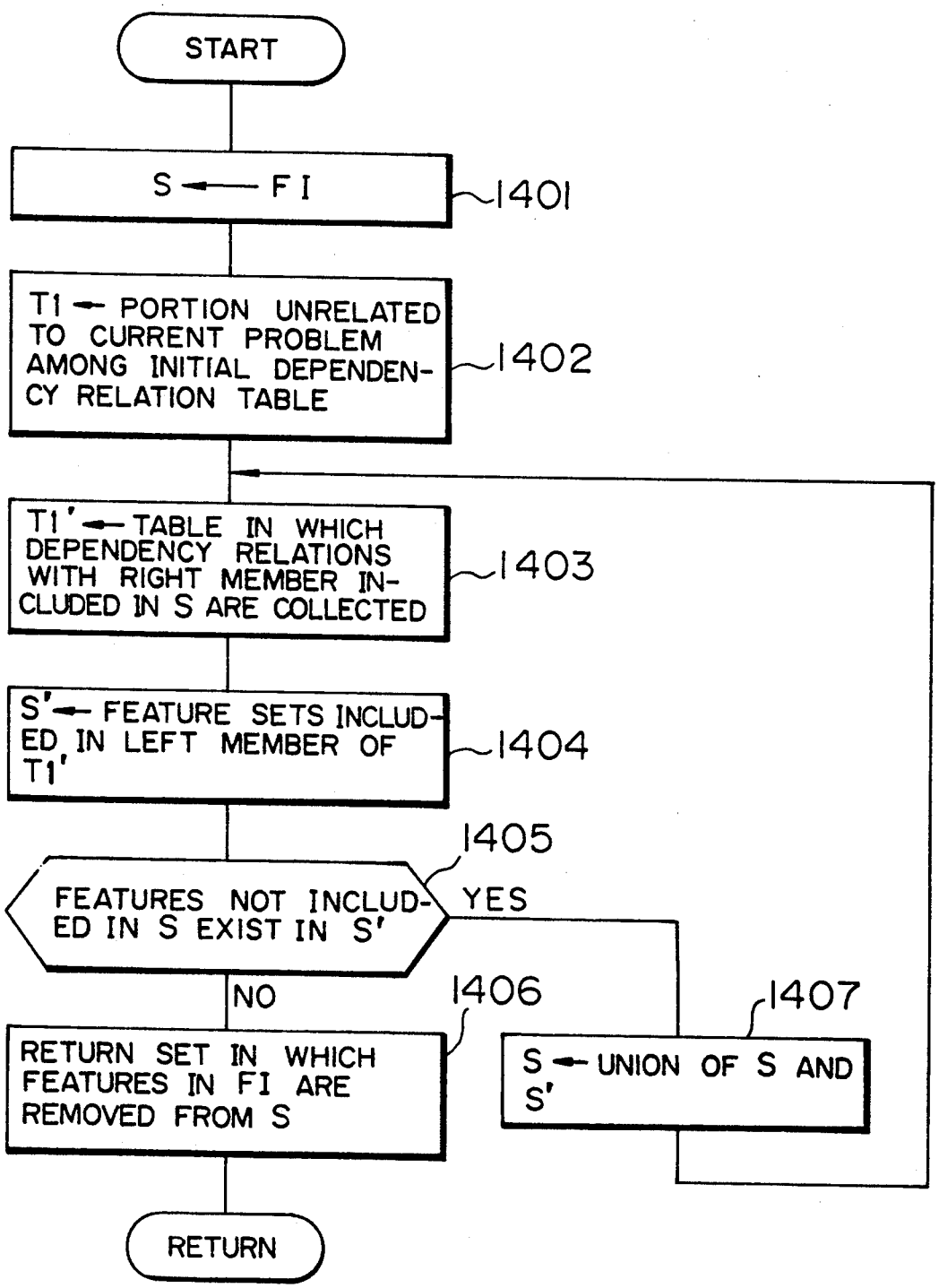
FIG. 15 is a flow chart showing a detailed operation of a case retrieval processing.
Figure 16:
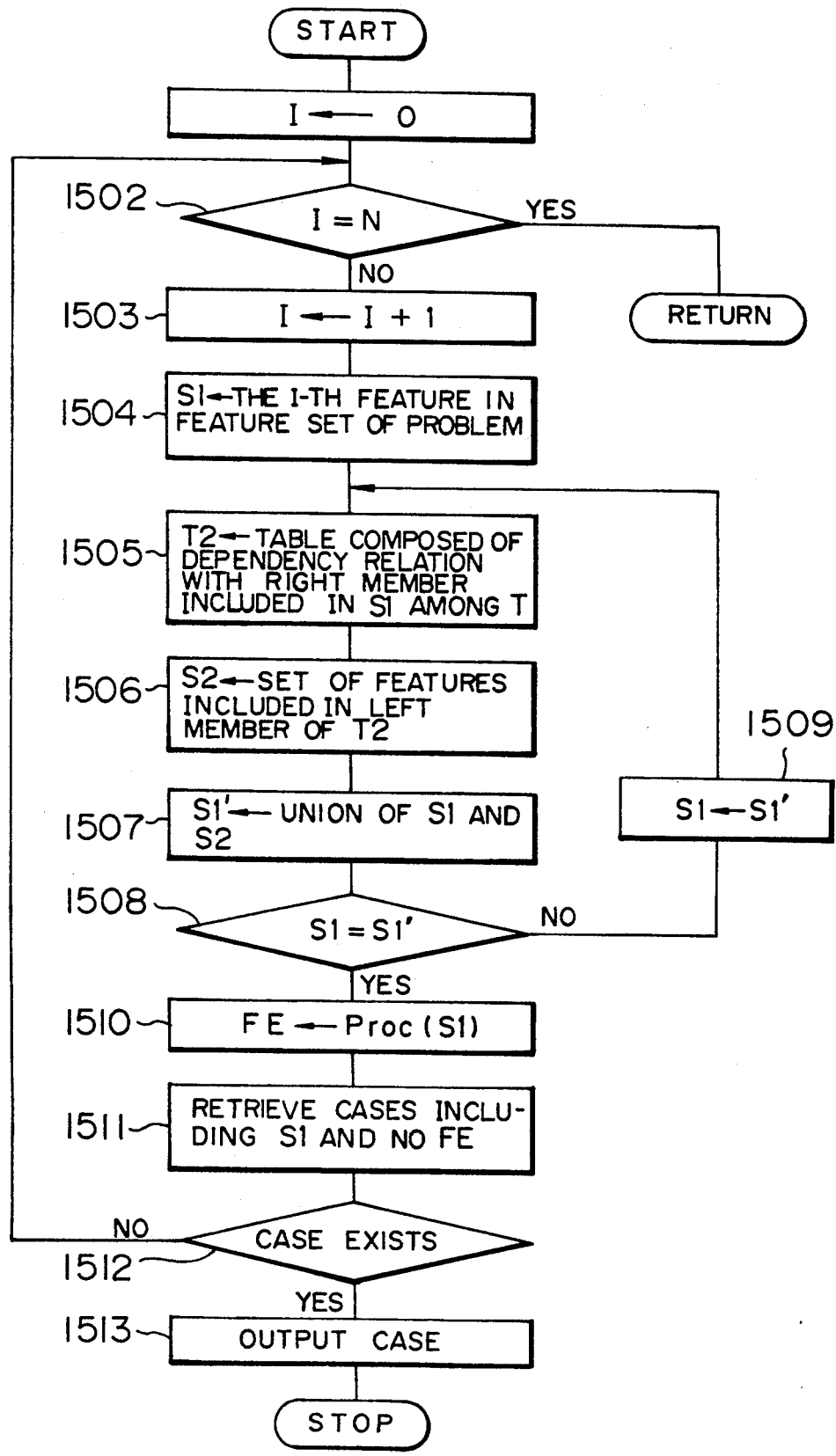
FIG. 16 is a flow chart showing an outline of an operation of another case retrieval processing.

FIG. 13 shows a portion which can be used without compensation when a case in which a card reader, a card puncher for katakana characters (hereinafter referred simply to as a card puncher), a central processing unit, a disk drive unit and a communication control unit are arranged is used for solving a current problem of arranging a console display, a card reader, a card puncher, a central processing unit and a disk drive unit. A region 1601 denotes a feature set representing the current problem, a region 1602 denotes a feature set representing a problem of the case, and a region 1603 denotes a feature set corresponding a usable portion (a set A in the theorem 1). The region 1603 shows a portion in which elements influenced by features (console display) included in either one of the regions 1601 and 1602 are removed from the common portion of these regions.

The partial problem represented by the region 1603, e.g., the layout problem of the central processing unit and the disk drive unit, corresponds to the partial problem P (=P') in the theorem 1. The solution of the case corresponding thereto, i.e., the layout of the central processing unit and the disk drive unit, corresponds to the solving method S (the portion usable without compensation for the influence).

A case having high usefulness for the solution of a current problem is considered to be one in which the range of a partial problem P' solvable by using the case is wide. Also, the range of the partial problem P' can be approximated with the number of elements of a corresponding feature set A.

Next, the theorem 1 is extended.

Theorem 2

It is assumed that neither the solution nor the solving method of a current problem has been determined at all or a part of the solution or the solving method thereof has been determined. On the other hand, it is assumed that a part or the whole of the solution or the solving method has been obtained in a case problem.

At this time, when a partial problem P of the case problem satisfies the following conditions, a part S of the solution or the solving method of the case corresponding to the partial problem P can be used as a part of the solution or the solving method of the current problem without compensation for influence.

(1) The partial problem P corresponds to the set A of features which are common to the current problem and the case problem.

(2) As to the partial problem P, the solution has not been determined in the current problem, and the solution has been obtained in the case.

(3) The feature set A is not influenced by features included in only one of the current problem and the case problem.

(4) The set A is not influenced by features corresponding to a common partial problem of the current problem and the case problem and in which solutions have been obtained in both and both solutions are different from each other.

(5) The set A is not influenced by features corresponding to the common partial problem of the current problem and the case problem and in which the solution has not been obtained in the case.

The above-described theorem will be proved briefly.

Proof

When it is assumed that a partial problem of a current problem corresponding to a feature set A is P', the partial problems P and P' are equal to each other from the condition (1). From the condition (2), the solution S of the partial problem P is already obtained and the solution of the partial problem P' has not been obtained. From the conditions (3) to (5), the partial problems P and P' are influenced by only a partial problem where an equal solution has already been obtained in the current and case problems, and are independent of partial problems other than the above. Accordingly, the partial problems P and P' are either independent of other partial problems or subject to equivalent influence. Thus, the solution or the solving method S of the partial problem P in the case is also the solution or the solving method of the partial problem P' in the solution of the current problem. Accordingly, the solution S can be used without compensation for the influence as the partial solution or the partial solving method of the current problem.

Next, the theorem 1 is modified.

Theorem 3

A solution or a solving method S of a case corresponding to a feature set A satisfying the condition (1) among solutions of analogous cases can be used as a part of a solution or a solving method of a current problem without compensation for the influence when the analogous cases for the current problem are retrieved using the following retrieval conditions (1) and (2). Provided that an optional set of features common to the current problem and the case problem is designated as A'.

(1) A feature set representing a case problem has to involve a set A of features that are included in a current problem among all of the features exerting an influence upon the set A'.

(2) The feature set representing the case problem should not intersect with a set B of features that are not included in the current problem among features that exert an influence upon the set A'. (Namely, a product set with B has to be empty.)

The above-described theorem will be proved briefly.

Proof

Since cases are retrieved by using the condition (1), the feature set A becomes a set of features which are common to the current problem and the case problem. The set A is a closure of influence relation based on the set A' (an ultimate feature set as the result of obtaining a feature set exerting an influence upon A', a feature set exerting an influence upon the above feature set, a feature set exerting an influence to that feature set ... until the feature set becomes no longer to get larger). Hence, the set A is equal to the set of features exerting an influence upon the set A. Therefore, all the features that influence the set A and are included in the current problem are also included in the case problem from the condition (1). As a result, the features included only in the current problem will never influence the set A. Similarly, the features that influence on the set A and are not included in the current problem are never included in the case problem from the condition (2). Thus, the features included in only the case problem will never influence the set A. Since (the partial problem represented by) the set A satisfies two conditions of the theorem 1 from the foregoing, a portion of the solution or the solving method of the case corresponding to the set A can be used without compensation for the influence.

Next, a case retrieving/inferring system will be explained with reference to the accompanying drawings.

Figure 2:
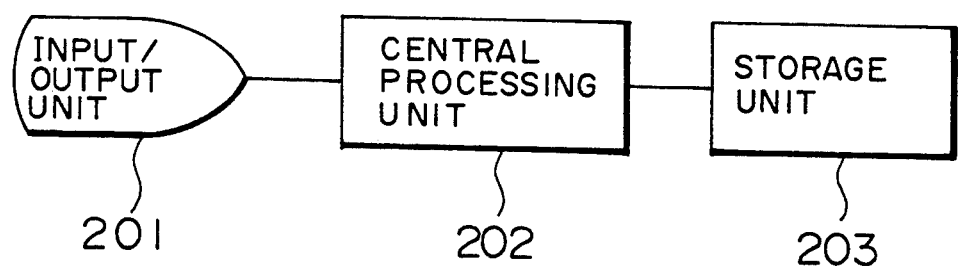
FIG. 2 is a block diagram showing a hardware structure of the present invention.

FIG. 2 shows a hardware structure of the system of the present invention. An input/output unit 201 receives case information, influence relation information, case using rules, problem and explanation requests for case retrieving process, and delivers them to a central processing unit 202. Also, the unit 201 receives a solution of the problem and explanation of the case retrieving process from the unit 202 and outputs them.

The central processing unit 202 receives the case information, the influence relation information and the case using rules from the input/output unit 201, and stores them in a storage unit 203. Also, when the unit 202 receives the problem from the input/output unit 201, the unit 202 accesses to the storage unit 203 and refers to the influence relation information to retrieve analogous case information of the problem among a group of case informations. Further, the unit 202 obtains the solution of the current problem from the solution for an analogous case of retrieved information using the case using rules, and outputs this solution to the input/output unit 201. At this time, an intermediate result obtained in the process of retrieving the analogous case information is stored in the storage unit 203 as retrieving process information. Furthermore, when the explanation request of case retrieving process is received from the input/output unit 201, explanation of the process for retrieving the analogous case information is outputted to the input/output unit 201 by reference to inferring process information and the influence relation information stored in the storage unit 203.

The storage unit 203 receives the case information, the influence relation information, the case using rules and the retrieving process information from the central processing unit 202 and stores them. Further, the unit 203 delivers the case information, the influence relation information, the case using rules and the retrieving process information to the central processing unit 202 in accordance with readout by the central processing unit 202.

Figure 1:
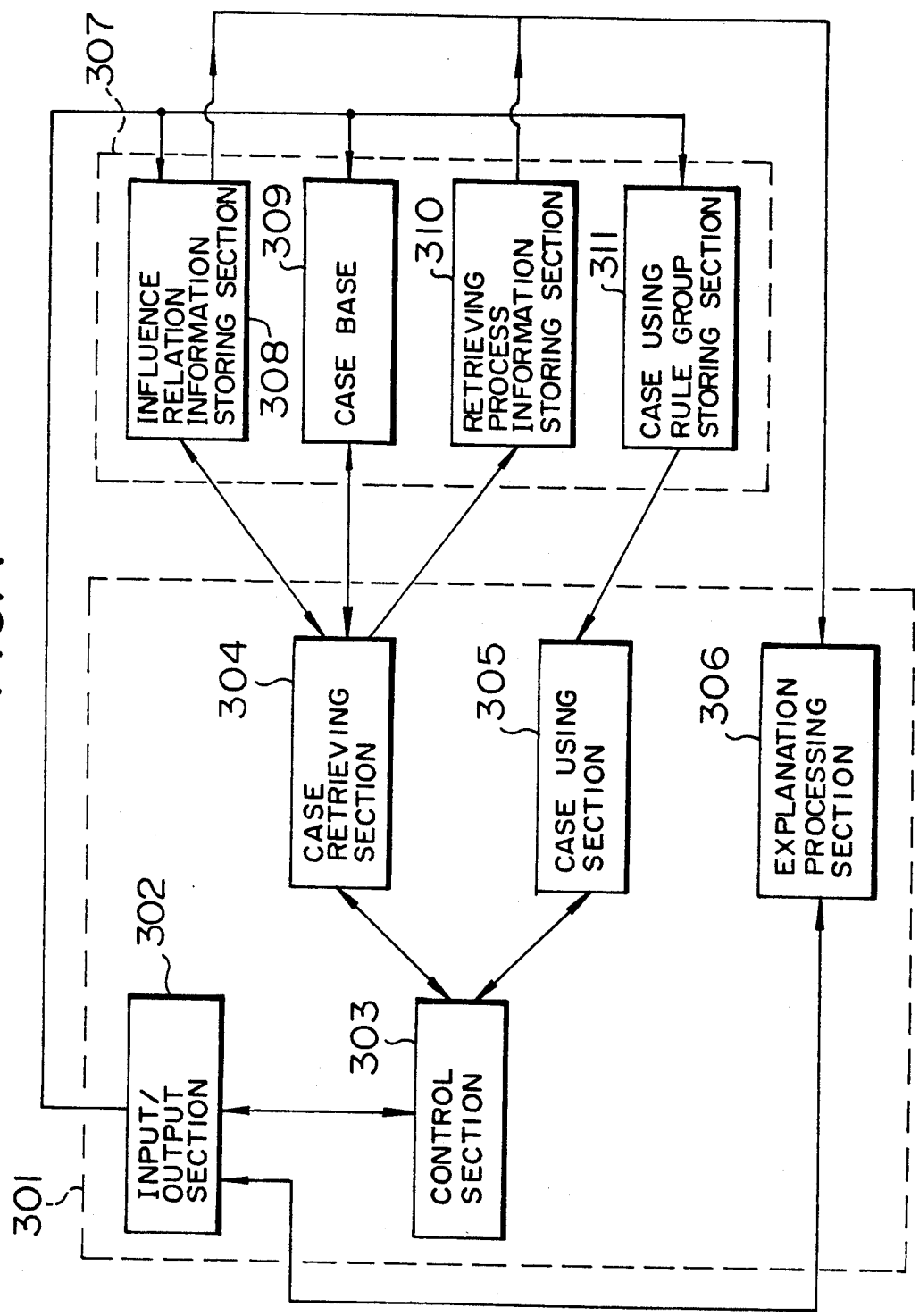
FIG. 1 is a block diagram showing a functional structure of a case retrieving/inferring system of the present invention.

FIG. 1 is a block diagram showing a functional structure of the case retrieving/inferring system of the present invention. A processing section 301 includes an input/output section 302, a control section 303, a case retrieving section 304, a case using section 305 and an explanation processing section 306. A storage section 307 includes an influence relation information storing section 308, a case base 309, a retrieving process information storing section 310 and a case using rule group storing section 311.

The input/output section 302 receives the influence relation information, the case information and the case using rules, and stores them in the section 308, the case base 309 and the section 311, respectively. The section 302 further receives a current problem and delivers it to the control section 303. Here, the current problem is represented by a set of features. Further, the section 302 receives explanation request for a process of retrieving a case and delivers it to the explanation processing section 306. On the other hand, the section 302 receives the solution of the current problem from the control section 303 and outputs it. Furthermore, the section 302 receives explanation for the process of retrieving the case from the section 306 and outputs it.

The control section 303 receives a set of features representing the current problem from the input/output section 302 and delivers it to the case retrieving section 304, and receives further an analogous case of the current problem and the feature set from the section 304 and delivers them to the case using section 305. Further, the section 303 receives the solution of the current problem from the section 305 and delivers it to the section 302.

The case retrieving section 304 receives a feature set representing the current problem from the control section 303, refers to influence relation information representing the influence relation among features stored in the section 308 and retrieves analogous cases from the case base 309 in accordance with the information referred to. The analogous case means a case in which the number of elements of a set of features reaches the maximum, the set of features being not influenced by the features included in only one of the current problem and a problem of the case, among the features which are common to the current problem and the case problem, i.e., a reference feature set.

In the process of retrieving analogous cases, the section 304 stores a plurality of cases which have become candidates for the analogous cases, i.e., analogous case candidates and the retrieved cases in the section 310. Furthermore, the section 304 stores the set of features common between the current problem and the case problem, the set of features included in only one of them and the reference feature set in the section 310 with respect to each of analogous case candidates. Note that these information stored in the section 310 will be referred to as retrieving process information. Moreover, the section 304 delivers the analogous cases and the reference feature set thereof to the control section 303.

The case using section 305 receives the analogous cases and the reference feature set thereof, and obtains the solution of the current problem by using the portion corresponding to the reference feature set among solutions of the analogous cases. This processing is performed by executing the case using rule group stored in the section 311. Respective rules in the case using rule group are executed in the order of description, i.e., in the order from the top. Finally, the obtained solution is delivered to the control section 303.

The explanation processing section 306 receives the retrieving process information and the influence relation information from the sections 310 and 308, respectively, in response to the explanation request for the process of retrieving the cases from the input/output section 302, and generates information for explaining the process of retrieving the analogous cases using above-described information and outputs it to the section 302.

The section 308 receives the influence relation information from the input/output section 302 and stores them. Further, the section 308 delivers the influence relation information to the retrieving section 304 and the processing section 306 in response to readout operation from the sections 304 and 306, respectively.

The case base 309 receives case information including data representing the current problem and data representing the solution of the current problem from the section 302 and stores them therein. Further, the case base 309 delivers the case information to the retrieving section 304 in response to the readout operation of the section 304.

The section 310 receives the retrieving process information from the retrieving section 304 and stores them therein. Further, the section 310 delivers the retrieving process information to the section 306 in response to the readout operation of the section 306.

The section 311 receives the case using rules for obtaining the solution of the current problem based on the solution of the analogous case from the input/output section 302 and stores them therein. Further, the section 311 delivers the case using rules to the using section 305 in response to the readout operation of the section 305.

FIG. 3 shows a structure of the influence relation information stored in the section 308 shown in FIG. 1. The influence relation information represents the influence relation among features, and is stored in a table form. In other words, the influence relation information may also be said to give constraint conditions for a problem to be solved. The data structure of the table is realized with a list structure or an array. The left member and the right member of the table includes sets of features, respectively. A block 401 is one item of the table, and corresponds to one influence relation. It is shown that the feature set in the left member of the block 401 influences the feature set in the right member. Strictly speaking, it is shown that when a problem represented by <feature 11> <feature 12>—<feature $1K_1$> in the left member changes, a problem represented by <feature 11'> <feature 12'>—<feature $1m_1'$> in the right member changes, too. Here, the description that a problem changes means that the solution or the side effect changes when the problem is solved. For example, consider an influence relation that the features in the left member are <layout of console display> and the features in the right member are <layout of card reader> and <layout of card puncher>. This relation shows that, when a problem represented by <layout of console display>, i.e., the problem of positioning the console display changes, a problem represented by <layout of card reader> and <layout of card puncher>, i.e., a problem of positioning a card reader and arranging a card puncher changes. Specifically, it is shown that the result of positioning a console display exerts an influence upon the results of positioning the card reader and arranging the card puncher.

FIG. 4 shows a structure of groups of case information stored in the case base 309 shown in FIG. 1. The case information groups are stored in a table form. The left member of the table shows data representing the problem, which are sets of features. The right member thereof shows data representing solutions of the problem. A block 501 corresponds to one case information and shows that the solution of the problem represented by <feature 11''> <feature 12''> ... <feature $1P_1''$> is <solution 1>.

FIG. 5 shows a structure of the groups of case using rules stored in the section 311 shown in FIG. 1. The left member of each case using rule represents a set of features. The right member thereof represents the processing for solving the problem represented by the feature set in the left member. A block 601 corresponds to one case using rule, and shows that the processing for solving a problem represented by <feature 11'''> <feature 12'''> ... <feature $1r_1'''$> is <processing 1>.

Figure 6:
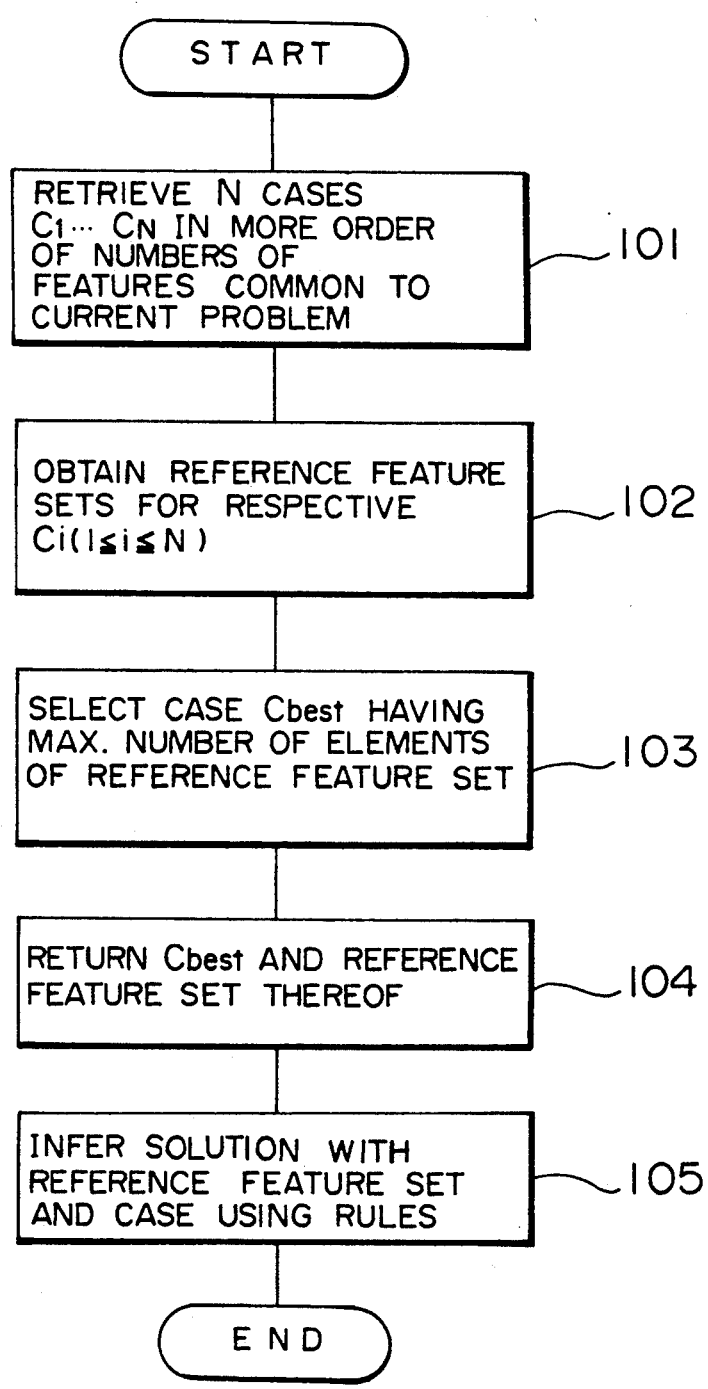
FIG. 6 is a flow chart showing an outline of an operation of case retrieval processing of a case retrieving/inferring system of the present invention.

FIG. 6 is a flow chart showing the operation of the case retrieving section 304 in FIG. 1. The section 304 obtains a set of features that are not influenced by features included in only one of a current problem and a case problem, i.e., a reference feature set among features common between the current problem and the case problem, and selects such a case that the number of elements reaches the maximum. However, it takes a very long processing period of time when there are a plenty number of cases to compute reference feature sets from all the cases in the case base 309. Thus, after retrieving cases which become candidates for selection, reference feature sets are obtained for respective candidates, and a candidate in which the number of elements reaches the maximum is selected.

In a step 101, cases which become candidates are retrieved. It is assumed that the number of candidates to be retrieved is N. It is considered that, if there are plenty of features which are common between the current problem and the case problem, the reference features are also numerous. Therefore, N cases are retrieved in an order of features which are common between the current problem and the case problem. The retrieved cases are substituted for set variables $C_1$ to $C_n$. In this processing, an intersection of a feature set representing the current problem and a feature sets representing the case problem is obtained first with respect to each case. Then, N cases are selected in the sequence from the maximum number of elements of the intersection.

In a step 102, a reference feature set is obtained from each case $C_i$ in set variables $C_1$ to $C_n$. This processing will be described in detail later with reference to FIG. 7.

In a step 103, a case having the maximum number of elements of the reference feature set is selected from the set variables $C_1$ to $C_n$ as an analogous case and substituted for a set variable $C_{best}$. In a step 104, the variable $C_{best}$ and the reference feature set thereof are returned to the control section 303, thus completing the retrieving processing. Note that the retrieving process information retrieved or computed in respective blocks (case candidates, reference feature sets and selected cases) is stored in the section 310 shown in FIG. 1. In a step 105, a solution for the current problem is inferred from the analogous case using the case using rule group by the case using section 305.

Figure 7:
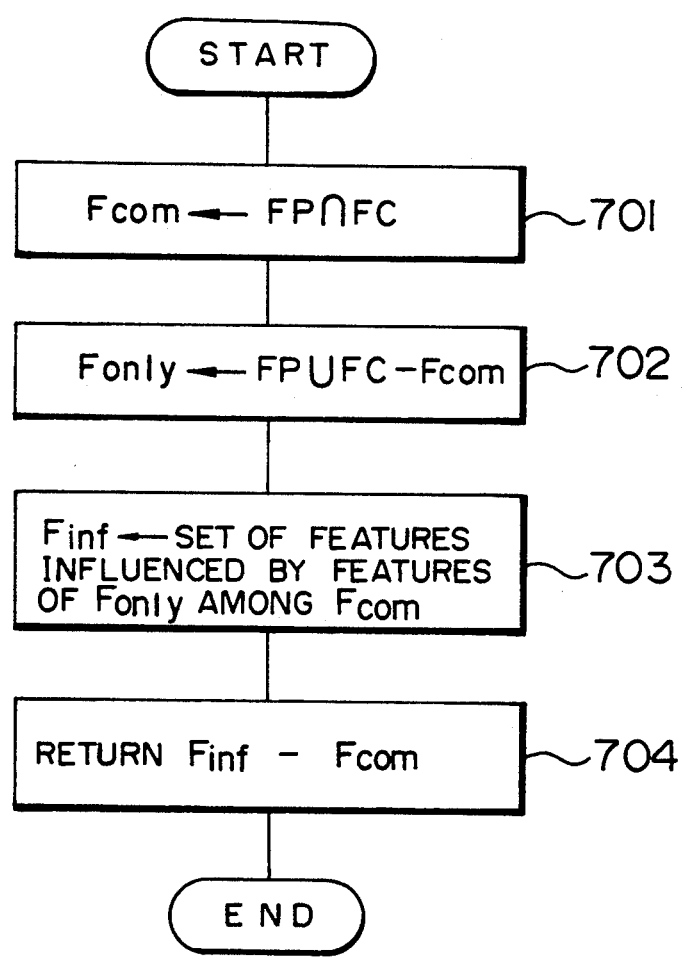
FIG. 7 is a flow chart showing a detailed operation of case retrieval processing of the present invention.

FIG. 7 shows the detail of processing for determining the reference feature set in the step 102 in FIG. 6. Here, it is assumed that the feature set representing the current problem is FP and the feature set representing the problem of the case C is FC.

In a step 701, an intersection of the sets FP and FC, i.e., a feature set which is common to the current problem and the case problem is obtained and substituted for a set variable $F_{com}$. In a step 702, a set in which elements of the variable $F_{com}$ are removed from the union of the sets FP and FC, i.e., a set of features included in only one of the current problem and the case problem is obtained and substituted for a set variable Fonly.

In a step 703, a set of features influenced by the features in the variable $F_{only}$ among the variable $F_{com}$ is obtained and substituted for a set variable $F_{inf}$. When a directed graph having the feature as a vertex and influence relation among features as sides is considered, the present processing may come to the processing of obtaining a transitive closure having the relation shown in the directed graph. For example, the present processing can be realized by such a processing system as shown in "Design and Analysis I of Algorithm", Science Corp. (1977), pp. 180–182.

In a step 704, a set in which elements of the variable $F_{inf}$ are removed from the variable $F_{com}$ is obtained. This is the reference feature set of the case C. This feature set is returned, thus completing the present processing.

The feature sets obtained in respective steps are stored in the section 310 shown in FIG. 1 as the retrieving process information.

It is shown hereinafter with reference to FIG. 8 to FIG. 10 that an appropriate analogous case can be retrieved according to the present invention. Here, a problem of arranging a variety of equipment in a computer room is assumed. In this problem, layout of respective equipments such as the layout of a console display and a central processing unit constitutes the features of the problem, and the result of positioning equipments is the solution of the problem. Although it is required to take elements such as configuration of the room and positions of pillars into consideration in an actual problem, these elements are not considered for the purpose of making the case easy to understand.

FIG. 8 shows an example of the influence relation information table stored in the section 308 shown in FIG. 1. A block 801 shows that the feature of arranging the console display exerts an influence upon the positioning of the card reader.

FIG. 9 shows an example of case groups stored in the case base 309 shown in FIG. 1. A block 901 shows that the solution of the problem of arranging a console display, a card reader and a floppy disk drive is <layout 1>.

FIG. 10 shows an example of a case using rule group stored in the section 311 shown in FIG. 1. Respective blocks represent rules that "when it is required to position equipments in the left member, execute processings shown in the right member". For example, a block 1001 represents a rule that <processing 1'> is to be executed if it is required to arrange a console display.

In this case using rule group, the execution sequence of the rules has an important meaning. The layout of respective equipments has an influence relation as shown in FIG. 8. When the positioning of an equipment A influences the positioning of an equipment B, it is required to position the equipment B taking the positioning result of the equipment A into consideration. Therefore, it is required to execute the positioning rule of the equipment A prior to the positioning rule of the equipment B. For example, the positioning of the console display influences the positioning of the card reader as shown in the block 801 in FIG. 8. Hence, it is required to execute the block 1001 which is a rule for positioning the console display in advance of the block 1003 which is a rule for positioning the card reader.

As described above, the case using section 305 shown in FIG. 1 executes respective rules in the rule group in the order of description, i.e., in the order from the block 1001 to the block 1006. Thus, the description order of the blocks 1001 to 1006 is a reflux of the influence relation shown in FIG. 8.

It is shown hereinafter that the present embodiment selects appropriate analogous cases from the case group shown in FIG. 9 by using the influence relation information table shown in FIG. 8 against a problem, "arrange a console display, a card reader, a card puncher and a tape reader". Furthermore, the solution of the current problem is obtained based on the selected analogous cases by using the case using rule groups shown in FIG. 10.

The current problem is inputted through the input-/output section 302 shown in FIG. 1, and delivered to the case retrieving section 304 through the control section 303. Then, the section 304 performs above-described processings. First, the feature group of the problem, i.e., {console display, card reader, card puncher, card reader} is substituted for the set variable FP. "Layout of an equipment A" will be simply referred to as "A" hereinafter unless special discrimination is required.

Next, the section 304 executes the processing shown in FIG. 6. In the step 101 in FIG. 6, N cases which become candidates are extracted. It is assumed that N=3 in this example. The number of features which are common to respective cases of blocks 901 to 904 and the current problem is 2, 3, 3 and 4, respectively. Then, three cases of the blocks 902 to 904 are selected and substituted for set variables $C_1$ to $C_3$.

In the step 102, reference feature sets are obtained on each of the variables $C_1$ to $C_3$ through the processing shown in FIG. 7. First, processing is executed with respect to the variable $C_1$. The set of features of the block 902 {console display, card puncher, tape reader} is substituted for the set of features FC of the case. In the step 701, a common partial set of the set of features FP of the current problem and the set of features FC of the case of the current problem, i.e., {console display, card puncher, tape reader} in this example, is obtained and substituted for the set variable $F_{com}$.

In the step 702, a feature set in which elements of the variable $F_{com}$ are removed from the union of the sets FP and FC, i.e., {card reader} in this example, is obtained and substituted for the variable $FP_{only}$. In the step 703, a set of features influenced by the card reader, i.e., {card puncher, tape reader} in this case, is obtained among the variable $F_{com}$, i.e., {console display, card puncher, tape reader} in this example, is obtained and substituted for the set variable $F_{inf}$.

In the step 704, the elements of the variable $F_{inf}$ are removed from the elements of the variable $F_{com}$, and the result, i.e., {console display} in this example, is returned as the reference feature set of the case $C_1$.

Next, in the step 102, a reference feature set, i.e., {console display, card reader, card puncher} in this example, is obtained by the processing similar to the above with respect to a case $C_2$, i.e., a case of the block 903. Furthermore, in the step 102, a reference feature set, i.e., {console display, card reader} in this example, is obtained through a similar processing with respect to a case $C_3$, i.e., a case of the block 904.

Next, in the step 103, a case having the maximum number of elements of the reference feature set is selected from $C_1$ to $C_3$. Here, the reference feature sets of the cases $C_1$ to $C_3$ are {console display}, {console display, card reader, card puncher} and {console display, card reader}, respectively. Therefore, the case $C_2$, i.e., the case of the block 903 is selected. In the step 104, the case of the block 903 and the reference feature set {console display, card reader, card puncher} are returned to the control section 303 shown in FIG. 1.

The section 303 obtains the solution of the current problem by reference to the rule group shown in FIG. 10 by using a partial solution corresponding to a reference feature set {console display, card reader, card puncher} among the solution in the case of the block 903, i.e., <layout 3>. To be concrete, the layout of the console display, the card reader and the card puncher among <layout 3> is used. An equipment other than the above, i.e., {tape reader} is arranged using the rule of the block 1005 in FIG. 10.

According to a conventional system, the problem of a case is more similar to a current problem as the given current problem and the case problem hold more features in common. Thus, the case of the block in FIG. 9 is selected as an analogous case in the above-described problem. The case of the block 904, however, includes a line printer. The line printer influences the positioning of the card puncher. Therefore, the positioning of the card puncher is subject to the influence by the line printer in the solution in the case of the block 904, i.e., <layout 4>. On the other hand, the line printer is not included in the current problem. Thus, it is impossible to use the layout of the card puncher in <layout 4> as it is in the current problem. Further, the line printer influences also the layout of the tape reader indirectly through the card puncher. Accordingly, <layout 4> can neither be used as it is with respect to the layout of the tape reader. With the above, even if the case of the block 904 is selected by a conventional case retrieving system, it is the layout of the console display and the card reader only that can be used as it is.

As against the above, the case of the block 903 is retrieved according to the present invention. Although the present case holds the console display, the card reader and the card puncher in common with the current problem, the equipments that exert an influence upon the layout thereof are included in neither the problem of the present case nor the current problem. Accordingly, the layout of all of these equipments in the block 903 can be used as it is in the current problem, and it is possible to retrieve a case having a great usefulness as compared with a conventional case retrieving system.

According to the present invention, it is possible to retrieve cases including much information applicable as it is to the current problem with a high priority in a case retrieving/inferring system which retrieves cases which furnish much information with problem solution from the case base and infers the solution. Hence, it is possible to prevent waste of time due to re-execution of retrieval and mistakes in determination based on an inappropriate case.

Further, according to a conventional case using method, the solution of a case is used on the whole features common to the current problem and the case problem. Therefore, processing for compensating influence among features becomes necessary. For example, it will be considered that there was no case of the block 903 in the case base in FIG. 9 in the solving example of the layout problem of the computer room. At this time, the case of the block 904 is selected. As a result, the arrangement of the card puncher and the tape reader which is subject to the influence by the layout of the line printer is used in the case use processing. In order to use such layout, processing for removing the influence by the layout of the line printer is required. In such a manner, processing for compensating the effect of influence among features is required according to a conventional case using method.

As against the above, features in the reference feature set, i.e., only the features having no effect by the influence are used. For example, even when the case of the block 904 is used, the layout of the card puncher and the tape reader is not used, but only the layout of the console display and the card reader which is not subject to the influence is used. Accordingly, processing for compensating the influence is not required.

According to the present invention, in an inferring system in which cases which furnish much information for problem solution are retrieved and a solution of a problem is obtained using those cases, it is possible to select information applicable to the current problem as it is and use the information. Therefore, it becomes possible to simplify the processing for applying case information to the current problem and to reduce the cost and the period of system development, thus improving performance and reliability of the system.

Next, a second embodiment of the present invention will be explained with reference to FIG. 11 and FIG. 12.

A hardware structure, a functional structure, a structure of influence relation information and a structure of a rule group of the present embodiment are similar to those in the first embodiment. The cases in the present embodiment are similar to the cases in the first embodiment, but are different in the following points. In the first embodiment, the whole solution of a problem of a case represented by the feature set in the left member has been described in the right member. As against the above, the whole or a part of the solution of the case problem is described in the right member in the present embodiment. Namely, a case in which only a part of a problem has been solved is also used in the present embodiment. In the present embodiment, a case where a part of the solution of the inputted current problem has been designated in advance is also included. Accordingly, the current problem includes a feature set representing the problem and the solution for the partial set thereof.

The functional structure of the present embodiment is similar to that in the first embodiment described with reference to FIG. 1, but the case retrieving section 304 and the case using section 305 are different being reflected by the difference between the current problem and the case problem as described above. Therefore, such different points will be explained hereinafter.

In the case retrieving section 304, those cases in that the number of elements of feature sets (reference feature sets) which satisfy the following conditions (1) to (5) reaches the maximum are retrieved as analogous cases from the case base.

(1) A set of features which are common to a current problem and a case problem.

(2) A solution of a corresponding partial problem has not been obtained in a current problem, but has been obtained in a case problem.

(3) Not influenced by features included only in one of a current problem and a case problem.

(4) Not influenced by features corresponding to a partial problem common to a current problem and a case problem, wherein solutions have been obtained in both of them and the solutions of both are different from each other.

(5) Not influenced by the features corresponding to the partial problem where solutions have not been obtained in the cases.

Furthermore, the section 304 delivers the retrieved cases and the reference feature sets thereof to the case using section 305.

The case using section 305 obtains the solution of the current problem based on the partial solution corresponding to the reference feature set among the solutions of the analogous cases. Thus, the section 305 executes the case using rule group stored in the section 311.

The operation of the case retrieving section 304 will be explained hereinafter with reference to FIG. 11 and FIG. 12.

In the present embodiment, after case candidates are retrieved first similarly to case retrieval processing in the first embodiment, reference feature sets are obtained for respective candidates and those candidates in that the number of elements reaches the maximum are selected.

Figure 11:
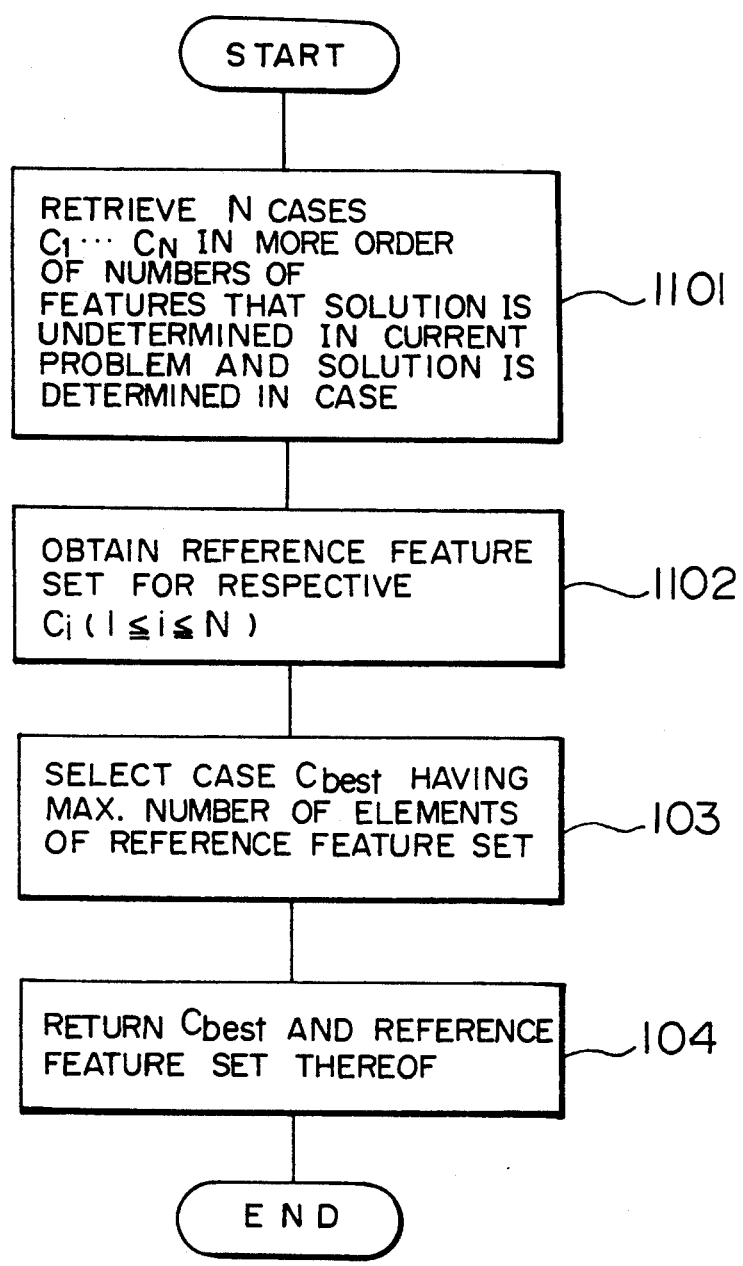
FIG. 11 is a flow chart showing an outline of an operation of another case retrieval processing of a case retrieving/inferring system of the present invention.
Figure 12:
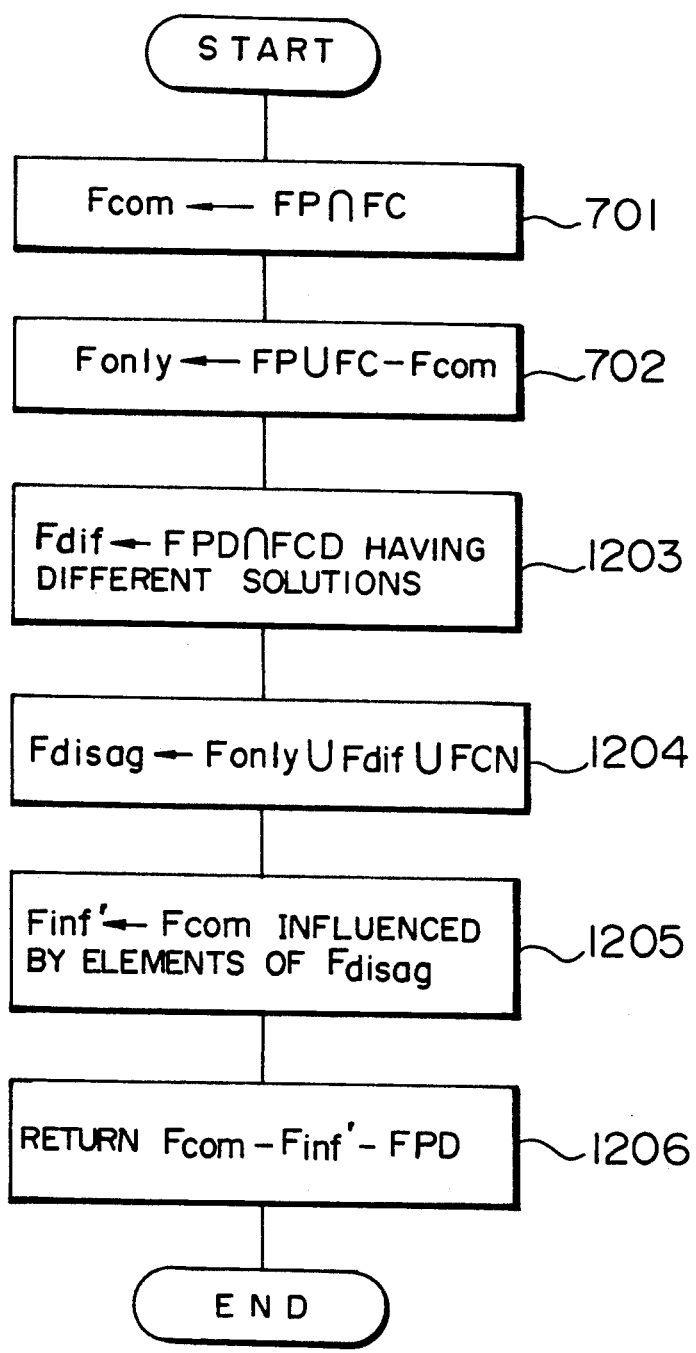
FIG. 12 is a flow chart showing a detailed operation of a case retrieval processing shown in FIG. 11.

In a step 1101 in FIG. 11, cases which become candidates are retrieved. The number of candidates to be retrieved is assumed to be N. In this example, only the conditions (1) and (2) are considered among above-described conditions (1) to (5), and N pieces of cases are retrieved in the sequence of plenty of features which satisfy these conditions and substituted for the set variables $C_1$ to $C_n$.

In a step 1102, reference feature sets are obtained with respect to variables $C_1$ to $C_n$, respectively. This processing will be described in detail later with reference to FIG. 12.

In steps 103 and 104, processing similar to the processing in FIG. 6 is executed and a case having the maximum number of elements of the reference feature set and the reference feature set thereof are returned, thus completing the processing.

Next, the operation of the block 1102 shown in FIG. 11 will be explained in detail with reference to FIG. 12. In this example, it is assumed that, among features in the current problem, a set of features in which the solutions of corresponding partial problems have been predetermined is FPD, and a set feature in which the solutions have been undecided is FPN, and, among the features of the problem of the cases, a set of features in which the solutions of corresponding partial problems have been predetermined is FCD and a set of features in which the solutions are undecided is FCN.

In steps 701 and 702, processing similar to that in FIG. 7 is executed, and a feature set common to the current problem and the case problem and a feature set included in only one of them are obtained and substituted for set variables $F_{com}$ and $F_{only}$, respectively.

In a step 1203, the feature sets corresponding to partial problems having different solutions depending on the current problem and the case problem are obtained among common sets of the current problem and the case problem and substituted for a set variable $F_{dif}$.

In a step 1204, a union of a feature set included in only one of the current problem and the case problem, feature sets corresponding to partial problems having different solutions depending on the current problem and the case problem of the case, and feature sets corresponding to partial problems in which the solutions are undecided in the problems of the cases is obtained and substituted for a set variable $F_{disag}$.

In a step 1205, a set of those that are influenced by the features in the variable $F_{disag}$ among the variable $F_{com}$ and substituted for a variable $F_{inf}$. This processing can be realized by a method similar to that of the step 703 shown in FIG. 7.

In a step 1206, feature sets in which elements of the variable $F_{inf}$ are removed from the variable $F_{com}$ are returned, thus completing the processing.

With the processing described above, above-described condition (1) is satisfied by the step 701, and the condition (2) is satisfied by the steps 1202 and 1206. Furthermore, conditions (3) to (5) are satisfied by the steps 1203 to 1207. Namely, it is possible to obtain a reference feature set through the processing shown in FIG. 12, and to retrieve a case in which the number of elements of a reference feature set reaches the maximum through the processing shown in FIG. 11.

The solutions of partial problems corresponding to reference feature sets among the cases can be used without compensation for the influence. According to the present invention, it is possible to retrieve a case in which the number of such features reaches the maximum.

As described above, according to the present invention, it is possible to retrieve a case including plenty of information applicable to a current problem as it is with the highest priority even when a part of the solution of the current problem has been designated in advance and a part of solution of the case has not been obtained. Therefore, it is possible to prevent waste of time due to re-execution of retrieval and mistakes in determination based on an inappropriate case.

Further, according to the present invention, it is possible to use the solution of a partial problem corresponding to the reference feature set among analogous cases.

Furthermore, according to the present invention, it is possible to select and use the information applicable to the current problem as it is among the information included in the case even when a part of the solution of the current problem has been designated in advance or a part of the solution of the case has not been obtained. Thus, it becomes possible to simplify the processing for applying case information to the current problem, thus enabling it to reduce the cost and the period of system development and to improve performance and reliability of the system.

The following may be given as a conclusion.

(1) In an information processing system provided with a case base for storing case information including data representing a problem and data representing a solution or a solving method thereof, an input section for inputting the problem and a case retrieving section for retrieving a case including problem data similar to the inputted problem or a partial problem of the inputted problem from the case base, there is provided a section for storing information representing influence relation among features of an assumed problem group. When a problem is inputted from the input section, the retrieving section retrieves cases, by reference to influence relation information, based on the set of features which are common to the inputted problem and the case problem and are not subject to influence from those features included in only one of the inputted problem and the case problem.

(2) When the problem is inputted from the input section, the retrieving section retrieves cases, by reference to influence relation information, based on a set of features which are common to the inputted problem and the case problem, the solution of a corresponding partial problem having been obtained in the case, are not subject to the influence by the features included in only one of the inputted problem and the case problem, which are not subject to influence by the features corresponding to such a partial problem that the partial solution is different depending on the inputted problem and the case, and which are not subject to influence by the features corresponding to such a partial problem that a partial solution has not been obtained in the case problem.

(3) A section for storing information representing influence relation between variables and constraints of the assumed problem group may be provided in place of the information representing influence relation between features. When the current problem is inputted from the input section, the retrieving section retrieves cases, by reference to influence relation information, based on a set of variables which are common to the current problem and the case problem, values of the variables having been obtained in the cases, which are not subject to influence by variables and constraints included in only one of the inputted problem and the case problem, which are not subject to the influence by such a variable in which the value is different depending on the inputted problem and the case, and which are not subject to influence by such a variable that the value has not been obtained in the problem of the case.

(4) At this time, the retrieving section retrieves cases based on the number of reference features or variable based on which case is selected.

(5) Further, means for storing the weights of features or variables may be provided, and the retrieving section may retrieve cases based on the sum of the weights of the elements of a set of reference features or variables for case retrieval.

(6) Otherwise, the retrieving section may retrieve cases based on an evaluation value of a set of reference features or variables for case retrieval.

(7) Furthermore, the retrieving section may retrieve cases based on the solution or the solving method of a partial problem corresponding to a set of reference features for case retrieval or the variable values corresponding to a set of reference variables for case retrieval.

(8) With respect to at least one type of five types, viz., feature, variable, constraint, variable value and partial solution, a section for determining equivalency among elements included in the type may be provided. The retrieving section or the inferring section (using section) is able to execute at least one processing of determination on whether the feature, the variable or the constraint is included in the inputted problem or the case problem or not, determination on whether the feature, the variable or the constraint is common to the inputted problem and the case problem or not, computation of an intersection of the feature, the variable or the constraint of the inputted problem and the case problem and determination on whether the variable values or the partial solutions are equal or not.

(9) The problem may be represented either by a set of features or by a feature set, a solution and information for coordination between a partial set of the feature set and a portion of the solution.

(10) At this time, a section for storing information including data of a problem represented by a set of features and data representing the solution of the problem and for coordination between the partial set of the feature set and the portion of the solution can be provided. At least one of the retrieving section and the inferring section may obtain at least one of the reference feature set for case retrieval and the used portion in the case.

(11) The same is applied when the problem is represented by a set of variables or by a set of variables, a set of values and information for coordination among variables.

(12) A section for determining similarity among elements included in a type with respect to at least one type of five types, i.e., feature, variable, constraint, variable value and partial solution, may be provided. At this time, the retrieving section or the inferring section executes, using a similarity determining section at least one processing of determining whether feature, variable or constraint is included in an inputted problem or a case problem or not, determining whether feature, variable or constraint is common to the inputted problem and the case problem or not, computation of the intersection of feature, variable or constraint of the inputted problem and the case problem, variable values or partial solutions of the inputted problem and the case problem are equal to each other or not.

(13) The influence relation information is referred to, and the cases having a large number of elements of the set of features which are features common to the inputted problem and the case problem and are not subject to the influence by the features included only in one of the current problem and the case problem are retrieved with priority. According to the above-described theorem 1, a portion corresponding to the feature set is the portion where the solution or the solving method can be used without compensation for the influence among the cases. The size of this portion can be approximated with the number of elements of the feature set. Accordingly, a case having a large portion usable without compensation for the influence, i.e., a case having high serviceability is retrieved with priority. The influence relation information is referred to, and a case having a large number of elements of a set of features which are common to the inputted problem and the case problem, the solution of the corresponding partial problem having been obtained in the case only, which are not subject to the influence by features included only in one of the current problem and the case problem, which are not subject to the influence by features corresponding to a partial problem in which partial solutions are different depending on the current problem and the case, and which are not subject to the influence by the features corresponding to the partial problem in which a partial solution has been obtained in the current problem only is retrieved with priority.

(14) According to the above-described theorem 2, a portion of a case corresponding to the feature set is the portion in which a solution or a solving method can be used without compensation for the influence on an occasion that a part of the solution of the inputted problem has been already determined. The size of this portion can be approximated with the number of elements of the feature set. Accordingly, a case having a large portion usable without compensation for the influence, i.e., a case having high serviceability is retrieved with priority. A case can be retrieved with the feature set A in the condition (1) of above-described theorem 3 as features to be included in the case to be retrieved and with the feature set B in the condition (2) as features which should not be included in the case to be retrieved. According to the theorem 3, the portion of the solution or the solving method of the case corresponding to the feature set A can be used without compensation for the influence. Accordingly, when the whole feature set of the inputted problem is initialized for the features to be included in a case to be retrieved and retrieval is repeated while making the set smaller gradually, a case in which the feature set A reaches the maximum is found in the first place. As a result, it is possible to retrieve a case in which the portion usable without compensation for the influence is the largest.

What is claimed is:

1. A method for retrieving optimum case information for a current problem, comprising the steps of:

retrieving case candidates having features common to features of the current problem from information representing a plurality of cases stored in a case base in response to presentation of the current problem, wherein the case base is stored in a storage unit and each case includes a case problem and a solution or solving method for the case problem;

determining ann optimum case candidate from the case candidates using a group of features of the current problem, a group of common features and a group of features of the case problems of said case candidates in accordance with influence relation information indicating a feature group influenced by other feature groups, said determining including determining reference feature groups of respective case candidates from the group of features of the current problem, the group of common features and the group of features of the case problems of respective case candidates in accordance with tine influence relation information, wherein features of one reference feature group are common to the current problem and the case problem and being subject to no influence by non-common features wherein said non-common features are features included in only one of the current problem and the case problem, and selecting one case candidate which has the largest number of features among the reference feature groups as the optimum case candidate; and retrieving case information corresponding to the optimum case candidate from information representing the plurality of cases.

2. A method according to claim 1, wherein a step of determining said reference feature group includes the steps of:

(a) determining an intersection of a problem feature set representing the group of features of a current problem and a case feature set representing the group of features of the case problems of said case candidates;

(b) determining a difference set obtained by removing the intersection from a union of the problem feature set and the case feature set;

(c) determining an influenced feature set wherein said influenced feature set is a set of features influenced by elements in the difference set by reference to the influence relation information;

(d) determining a reference feature set by removing the influenced feature set from the intersection; and (e) repeating steps (a) to (d) over all the case candidates.

3. A method according to claim 1, further comprising the steps of:

storing information obtained in the step of retrieving case candidates and the step of determining the optimum case candidate in a retrieving process information storing unit as retrieving process information; and representing the retrieving process information or influence relation information from the retrieving process information storing unit in response to an explanation request.

4. A system for retrieving optimum case information for a current problem, comprising:

a case base storing unit for storing a case base which stores information representing a plurality of cases;

candidate retrieving means for retrieving case candidates having features common to features of the current problem from information representing a plurality of cases stored in the case base by accessing said case base storing unit in response to input of the current problem, said case candidates including case problems and solutions or solving methods for the case problems;

optimum candidate determining means for responding to said candidate retrieving means and for determining an optimum case candidate among said case candidates based on a group of features of the current problem, a group of common features and a group of features of the case problems of said case candidates in accordance with influence relation information indicating a feature group influenced by other feature groups, said optimum case candidate determining means including a reference feature group determining means for determining reference feature groups of said case candidates from the group of features of the current problem, the group of common features and the group of features of the case problems of said case candidates in accordance with the influence relation information, wherein features of the reference feature group are common to the current problem and the case problem and being subject to no influence by non-common features wherein said non-common features are features included in only the current problem or the case problem, and selecting means for selecting one case candidate having the largest number of features among the reference feature groups as the optimum case candidate; and optimum case information retrieving means for responding to said optimum candidate determining means and for retrieving optimum case information corresponding to said optimum case candidate from information representing the plurality of cases.

5. A system according to claim 4, wherein said reference feature group determining means includes:

operating means for executing an operation for determining an intersection of a problem feature set representing the group of features of the current problem and a case feature set representing the group of features of the case problems of said case candidates, determining a difference set obtained by removing the intersection from a union of the problem feature set and the case feature set, determining an influenced feature set wherein said influenced feature set is a set of features influenced by elements in the difference set by reference to the influence relation information, and determining a reference feature set wherein said reference feature set is obtained by removing the influenced feature set from the intersection; and means for having said operating means execute one or more operations on all the case candidates.

6. A system according to claim 4, further comprising:

a retrieving process information storing unit;

means for storing information obtained from said retrieving case candidates step and from said determining the optimum case candidate step in said retrieving process information storing unit as retrieving process information; and representing means for representing said retrieving process information or influence relation information from said retrieving process information storing unit in response to an explanation request.

7. A method for inferring an optimum solution for a current problem, comprising the steps of:

retrieving case candidates having features common to features of the current problem from information representing a plurality of cases stored in a case base in response to a presentation of the current problem, a storing unit storing the case base and the plurality of cases including case problems and solutions or solving methods for the case problems;

determining an optimum case candidate among said case candidates based on a group of features of the current problem, a group of common features and a group of features of the case problems of said case candidates in accordance with influence relation information showing feature groups influenced by other features groups, said determining said optimum case candidate includes determining reference feature groups of said case candidates from the group of features of the current problem, the group of common features and the group of features of the case problems of said case candidates, wherein features of a reference feature group are common to the current problem and the case problem and being subject to on influence by non-common features wherein said non-common features are features included in only one of the current problem and the case problem and selecting one case candidate having the largest number of features among the reference feature groups as the optimum case candidate;

retrieving optimum case information corresponding to the optimum case candidate from information representing the plurality of cases; and inferring a solution for the current problem from a solution or a solving method for the case problem in the optimum case information in accordance with a case using rule group.

8. A method according to claim 7, wherein the step for determining said reference feature group includes the steps of:

(a) determining an intersection of a problem feature set representing the group of features of the current problem and a case feature set representing the group of features of the case problems of said case candidates;

(b) determining a difference set obtained by removing the intersection from a union of the problem feature set and the case feature set;

(c) determining an influenced feature set which are features influenced by elements in the difference set by reference to the influence relation information;

(d) determining a set obtained by removing the influenced feature set from the intersection; and (e) repeating the steps (a) to (d) over all said case candidates.

9. A method according to claim 7, further comprising the steps of:

storing information obtained in the step of retrieving case candidates and the step of determining an optimum case candidate in a retrieving process information storing unit as retrieving process information; and representing the retrieving process information or influence relation information from the retrieving process information storing unit in response to an explanation request.

10. A system according to claim 7, wherein:

said case using rule group is comprised of one or more case using rules wherein said one or more case using rules include a group of features and processing steps for solving respective portions of a case problem represented by the group of features, and said inferring step includes the step of executing said one or more case using rules of the case using rule group.

11. A system for retrieving optimum case information for a current problem, comprising:

a case base storing unit for storing a case base which stores information representing a plurality of cases;

candidate retrieving means for retrieving case candidates having features common to features of the current problem from information representing said plurality of cases stored in said case base by accessing said case base storing unit in response to an input of the current problem, said plurality of cases including case problems and solutions for solving methods for the case problems;

optimum candidate determining means for responding to said candidate retrieving means and for determining an optimum case candidate among said case candidates based on a group of features of the current problem, a group of common features and a group of features of case problems of said case candidates in accordance with influence relation information indicating a feature group influenced by other feature groups, said optimum candidate determining means including a reference feature group determining means for determining reference feature groups of said case candidates from the group of features of the current problem, the group of common features and the group of features of the case problems of said case candidates in accordance with the influence relation information, wherein features of the reference feature group are common to the current problem and the case problem and being subject to no influence by non-common features wherein said non-common features are features included in only the current problem or the case problem, and selecting means for selecting one case candidate having the largest number of features among the reference feature groups as the optimum case candidate;

optimum case information retrieving means for responding to said optimum candidate determining means and for retrieving optimum case information corresponding to the optimum case candidate from information representing the plurality of cases; and inferring means for inferring a solution for the current problem from the solution or the solving method for the case problem in the optimum case information in accordance with a case using rule group.

12. A system according to claim 11, wherein said reference feature group determining means includes:

operating means for executing an operation for determining an intersection of a problem feature set representing a group of features of the current problem and a case feature set representing a group of features of problems of respective case candidates, determining a difference set obtained by removing the intersection from a union of the problem feature set and the case feature set, determining a set of influenced features which are influenced by elements in the difference set by reference to influence relation information, and determining a set obtained by removing the set of the influenced features from the intersection as a reference feature set; and means for having said operating means execute one or more operations on all the case candidates.

13. A system according to claim 11, further comprising:
- a retrieving process information storing unit;
- means for storing information obtained from determining the optimum case candidate in said retrieving process information storing unit as retrieving process information; and
- representing means for representing the retrieving process information or influence relation information from said retrieving process information storing unit in response to an explanation request.

14. A system according to claim 11, wherein said case using rule group is comprises of one or more case using rules wherein said one or more case using rules include a group of features and processing steps for solving respective portions of a case problem represented by the group of features.

15. A method for retrieving optimum case information for a current problem, comprising the steps of:
- retrieving case candidates having features common to unsolved features of the current problem from information representing a plurality of cases stored in a case base in response to presentation of the current problem, wherein the case base is stored in a storage unit and each case includes a case problem and a solution or solving method for the case problem, wherein the current problem comprises at least one solved part, an unsolved part, and a satisfied part of the solution for the problem being described in the case;
- determining a reference feature group of each case in accordance with influence relation information indicating a feature group influenced by other feature groups, each of the features of the reference feature group being not influenced by common features which are common to the current problem and the case problem and are included in the unsolved part of the current problem and are included in the part of the case problem having the solution described therein and are included only in the current problem or case problem, by the features which are included in part of the solved part of the current problem difference in solution from the case, and by the features which are included in part of the case problem having no solution described therein;
- selecting as an optimum case candidate one of the case candidates having a highest number of features matching the features of the reference feature group; and
- retrieving case information corresponding to the optimum case candidate from information representing the plurality of cases.

16. A system for retrieving optimum case information for a current problem, comprising:
- a case base storage unit for storing a case base, the case base comprising a plurality of cases;
- candidate retrieving means for accessing the case base storage unit in response to a presentation of the current problem and for retrieving candidates of the cases which have features common to unsolved features of the current problem on a bases of information of the plurality of cases stored in the case base, each of the cases include a case problem and a solution or solution method for the case problem, wherein the current problem comprises at least one solved part, an unsolved part, and a satisfied part of the solution for the problem being described in the case;
- optimum candidate deciding means, in response to the candidate retrieving means, for determining a reference feature group of each case information in accordance with influence relation information indicating a feature group influenced by other feature groups, each of the features of the reference feature group being not influenced by the features which are common to the current problem and the case problem and are included in the unsolved part of the current problem and are included in the part of the case problem having the solution described therein and are included only in the current problem or case problem, by the features which are included in part of the solved part of the current problem different in solution from the case, and by the features which are included in part of the case problem having no solution described therein, the optimum candidate deciding means also selecting as the optimum case candidate one of the case candidates in one of the reference features groups which is highest in the feature number; and
- optimum case information retrieving means for retrieving case information corresponding to the optimum case candidate from information representing the plurality of cases.

17. A method for retrieving optimum case information for a current problem, comprising the steps of:
- retrieving case candidate having features common to unsolved features of the current problem from information representing a plurality of cases stored in a case base in response to a presentation of the current problem, wherein the case base is stored in a storage unit and each case includes a case problem and a solution or solving method for the case problem, wherein at least one part of the current problem is already solved and a satisfied part of the solution for the problem being described in the case;
- determining a reference feature group of each case information in accordance with influence relation information indicating a feature group influenced by other feature groups, each of the features of the reference feature group being not influenced by the features which are common to the current problem and the case problem and are included in the unsolved part of the current problem and are included in the part of the case problem having the solution described therein and are included only in the current problem or case problem, by the features which are included in part of the already-solved part of the current problem different in solution from the case, and by the features which are included in part of the case problem having no solution described therein;
- selecting as an optimum case candidate one of the case candidates from one of the reference feature groups which has a highest feature number;
- retrieving an optimum case information corresponding to the optimum case candidate from information representing the plurality of cases; and
- inferring a solution of the current problem from the solution or solving method of the case problem in the optimum case information in accordance with a group of case application rules.

18. A system for retrieving optimum case information for a current problem, comprising:

a case base storage unit for storing therein a case base which stores therein information indicative of a plurality of cases;

candidate retrieving means for the case base storage unit in response to a presentation of the current problem and for retrieving candidates of the cases which have features common to unsolved features of the current problem on the basis of the information of the plurality of cases stored in the case base, each of the cases include a case problem and a solution or solution method for the case problem, wherein at least one part of the current problem is already solved and a satisfied part for the solution of the problem being described in the case;

optimum candidate deciding means, in response to the candidate retrieving means, for determining a reference feature group of each case information in accordance with influence relation information indicating a feature group influenced by other feature groups, each of the features of the reference feature group being not influenced by the features which are common to the current problem and the case problem and are included in the unsolved part of the current problem and are included in the part of the case problem having the solution described therein and are included only in the current problem different in solution from the case, and by the features which are included in part of the case problem having no solution described therein, the optimum candidate deciding means also selecting as an optimum case candidate one of the case candidate in one of the reference feature groups which has a highest feature number;

optimum case information retrieving means for retrieving case information corresponding to the optimum case candidate from information representing the plurality of cases; and inferring means for inferring a solution of the current problem from the solution or solving method of the case problem in the optimum case information in accordance with a group of case application rules.

19. A method for retrieving optimum case information for a current problem having features, comprising the steps of:

determining a current problem feature set comprised of the features of the current problem;

retrieving case candidates from a plurality of cases stored in a case base having features common to the features of the current problem in response to a request to solve the current problem, wherein the case base is stored in a storage unit and each case includes a case problem and a solution or solving method for the case problem;

generating a case problem feature set comprised of features of the case problem of the case candidate retrieved;

generating a common feature set wherein the common feature set is an intersection set between the current problem set and the case problem set;

generating a non-common feature set wherein the non-common feature set is obtained by subtracting the common feature set from a union of the current problem feature set and the case problem feature set;

generating an influenced feature set wherein the influenced feature set is a set of features influenced by features in the non-common feature set based on influence relation information;

generating a reference feature set wherein the reference feature set is equal to the common feature set minus features contained in the influenced feature set;

selecting one case candidate having a greatest number of features which match the features of the reference feature set as an optimum case candidate; and retrieving case information corresponding to the optimum case candidate from the plurality of cases.

* * * * *

UNITED STATES PATENT AND TRADEMARK OFFICE
CERTIFICATE OF CORRECTION

PATENT NO. : 5,319,739
DATED : June 7, 1994
INVENTOR(S) : Hiroshi Yoshiura, et al.

It is certified that error appears in the above-indentified patent and that said Letters Patent is hereby corrected as shown below:

Claim 1, column 23, line 1, delete "ann" and substitute therefor --an--.

Claim 1, column 23, line 12, delete "tine" and substitute therefor --the--.

Claim 7, column 25, line 17, delete "on" and substitute therefor --no--.

Claim 11, column 26, line 14, delete "for" and substitute therefor --or--.

Claim 14, column 27, line 13, delete "comprises" and substitute therefor --comprised--.

Claim 16, column 27, line 62, delete "bases" and substitute therefor --basis--.

Claim 16, column 28, line 22, delete "features" and substitute therefor --feature--.

Signed and Sealed this

Twenty-third Day of August, 1994

Attest:

BRUCE LEHMAN

*Attesting Officer*          *Commissioner of Patents and Trademarks*